United States Patent
Kwan

(10) Patent No.: US 7,562,390 B1
(45) Date of Patent: Jul. 14, 2009

(54) SYSTEM AND METHOD FOR ARP ANTI-SPOOFING SECURITY

(75) Inventor: Philip Kwan, San Jose, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 649 days.

(21) Appl. No.: 10/631,091

(22) Filed: Jul. 31, 2003

Related U.S. Application Data

(60) Provisional application No. 60/472,158, filed on May 21, 2003, provisional application No. 60/472,170, filed on May 21, 2003.

(51) Int. Cl.
*G06F 11/00* (2006.01)
(52) U.S. Cl. ........................................ 726/23
(58) Field of Classification Search ................ 713/151, 713/154, 164, 188; 726/22, 23; 709/223, 709/238
See application file for complete search history.

(56) References Cited

U.S. PATENT DOCUMENTS

| | | | |
|---|---|---|---|
| 4,897,874 A | 1/1990 | Lidinsky et al. | |
| 5,237,614 A | 8/1993 | Weiss | |
| 5,721,780 A | 2/1998 | Ensor et al. | |
| 5,757,924 A | 5/1998 | Friedman et al. | |
| 5,774,551 A | 6/1998 | Wu et al. | |
| 5,825,890 A | 10/1998 | Elgamal et al. | |
| 5,892,903 A | 4/1999 | Klaus | |
| 5,894,479 A | 4/1999 | Mohammed | |
| 5,946,308 A | 8/1999 | Dobbins et al. | |
| 5,958,053 A | 9/1999 | Denker | 713/201 |
| 6,009,103 A | 12/1999 | Woundy | |
| 6,167,052 A | 12/2000 | McNeill et al. | |
| 6,167,445 A | 12/2000 | Gai et al. | |
| 6,212,191 B1 | 4/2001 | Alexander et al. | |
| 6,256,314 B1 | 7/2001 | Rodrig et al. | |
| 6,338,089 B1 | 1/2002 | Quinlan | |
| 6,339,830 B1 | 1/2002 | See et al. | |
| 6,363,489 B1 | 3/2002 | Comay et al. | |
| 6,393,484 B1 | 5/2002 | Massarani | |
| 6,519,646 B1 | 2/2003 | Gupta et al. | 709/229 |
| 6,553,028 B1 | 4/2003 | Tang et al. | |
| 6,732,270 B1 | 5/2004 | Patzer et al. | |

(Continued)

OTHER PUBLICATIONS http://www.cisco.com/en/US/tech/tk86/tk803/technologies_tech_note09186a00800a7828.shtml (PDF & web pages), entitled "Cisco—Cable Source—Verify and IP Address Security," printed Jul. 23, 2003, 25 pages in length.

(Continued)

*Primary Examiner*—Beemnet W Dada
(74) *Attorney, Agent, or Firm*—Townsend and Townsend and Crew LLP

(57) ABSTRACT

A system and method that provides for copying ARP replies, and generating data packets which include the ARP reply, and other information such as an identification of the port on the ARP reply was received. These data packets are then transmitted to an ARP collector which stores the ARP reply and port information. The ARP collector then uses this stored information, and analyzes future data packets relative to the stored information to detect occurrences of ARP spoofing. The ARP collector further provides for generating alerts and taking security actions when ARP reply spoofing is detected.

17 Claims, 8 Drawing Sheets

U.S. PATENT DOCUMENTS

| | | | |
|---|---|---|---|
| 6,751,728 B1* | 6/2004 | Gunter et al. | 713/153 |
| 6,771,649 B1* | 8/2004 | Tripunitara et al. | 370/395.54 |
| 6,775,290 B1 | 8/2004 | Merchant et al. | |
| 6,807,179 B1 | 10/2004 | Kanuri et al. | |
| 6,813,347 B2 | 11/2004 | Baals et al. | |
| 6,874,090 B2 | 3/2005 | See et al. | |
| 6,892,309 B2 | 5/2005 | Richmond et al. | |
| 6,907,470 B2 | 6/2005 | Sawada et al. | |
| 6,912,592 B2 | 6/2005 | Yip | |
| 6,950,628 B1 | 9/2005 | Meier et al. | |
| 6,980,515 B1* | 12/2005 | Schunk et al. | 370/230.1 |
| 7,028,098 B2 | 4/2006 | Mate et al. | |
| 7,062,566 B2 | 6/2006 | Amara et al. | |
| 7,088,689 B2 | 8/2006 | Lee et al. | |
| 7,134,012 B2* | 11/2006 | Doyle et al. | 713/151 |
| 7,188,364 B2 | 3/2007 | Volpano | |
| 7,194,554 B1 | 3/2007 | Short et al. | |
| 7,234,163 B1* | 6/2007 | Rayes et al. | 726/22 |
| 7,249,374 B1 | 7/2007 | Lear et al. | |
| 7,360,086 B1 | 4/2008 | Tsuchiya et al. | |
| 7,483,971 B2 | 1/2009 | Sylvest et al. | |
| 7,516,487 B1 | 4/2009 | Szeto et al. | |
| 7,523,485 B1 | 4/2009 | Kwan | |
| 2002/0055980 A1 | 5/2002 | Goddard | |
| 2002/0065938 A1 | 5/2002 | Jungck et al. | |
| 2002/0133534 A1 | 9/2002 | Forslow | |
| 2002/0146002 A1 | 10/2002 | Sato | |
| 2003/0028808 A1 | 2/2003 | Kameda | |
| 2003/0037163 A1 | 2/2003 | Kitada et al. | |
| 2003/0043763 A1 | 3/2003 | Grayson | |
| 2003/0056001 A1 | 3/2003 | Mate et al. | |
| 2003/0056063 A1 | 3/2003 | Hochmuth et al. | |
| 2003/0065944 A1 | 4/2003 | Mao et al. | |
| 2003/0067874 A1 | 4/2003 | See et al. | |
| 2003/0105881 A1 | 6/2003 | Symons et al. | |
| 2003/0142680 A1 | 7/2003 | Oguchi | |
| 2003/0217151 A1 | 11/2003 | Roese et al. | |
| 2004/0003285 A1 | 1/2004 | Whelan et al. | |
| 2004/0160903 A1 | 8/2004 | Gai et al. | |
| 2004/0210663 A1 | 10/2004 | Phillips et al. | |
| 2004/0213172 A1* | 10/2004 | Myers et al. | 370/313 |
| 2004/0255154 A1 | 12/2004 | Kwan et al. | |
| 2005/0025125 A1 | 2/2005 | Kwan | |
| 2005/0055570 A1 | 3/2005 | Kwan et al. | |
| 2005/0091313 A1 | 4/2005 | Zhou et al. | |
| 2005/0185626 A1 | 8/2005 | Meier et al. | |
| 2005/0254474 A1* | 11/2005 | Iyer et al. | 370/338 |
| 2006/0028996 A1* | 2/2006 | Huegen et al. | 370/252 |
| 2006/0155853 A1* | 7/2006 | Nesz et al. | 709/227 |
| 2007/0220596 A1 | 9/2007 | Keeler et al. | |

OTHER PUBLICATIONS http://www.sans.org/rr/threats/spoofed.php (PFD and web pages), entitled Spoofed IP Address Distributed Denial of Service Attacks: Defense-in-Depth, printed Jul. 23, 2003, 7 pages in length.

http://www.cert.org/incident_notes/IN-2000-04.html, entitled "CERT® Incident Note IN-2000-04 (Denial of Service Attacks using Nameservers)," printed Jul. 23, 2003, 3 pages in length.

http://www.anml.iu,edu/PDF/Automatic_Spoof_Detector.pdf, entitled "Automatic Spoof Detector (aka Spoofwatch)," dated Jan. 28, 2002, printed Jul. 23, 2003, 2 pages in length.

http://www.linuxgazette.com/issue63/sharma.html, entitled "IP Spoofing," printed Jul. 23, 2003, 3 pages in length.

http://www.legions.org/kv/kv7.txt, entitled "Keen Veracity Legions of the Underground Issue # [7],:" printed Jun. 24, 2003, pp. 1-41.

http://www.networkcommand.com/docs/ipspoof.txt, entitled "[ IP-spoofing Demystified ] (Trust-Relationship Exploitation)," Jun. 1996, printed May 18, 2003, pp. 1-9.

http://www.cisco.com/en/US/products/hw/switches/ps574/products_configuration_guide_chapter09186a008007ef90.html#xtocid3 (PDF & web pages), entitled "Cisco Catalyst 1900 Series Switches," printed Jul. 29, 2003, 13 pages in length.

http://www.cisco.com/en/US/products/sw/iosswrel/ps1839/products_feature_guide09186a00801543c8.html#1027177 (PDF & web pages), entitled "Cisco IOS Software Releases 12.2 T," printed Jul. 29, 2003, 26 pages in length.

http://www.cisco.com/en/US/tech/tk648/tk361/technologies_tech_note09186a0080094adb.shtml (PDF & web pages), entitled "IP Addressing Services," printed Jul. 29, 2003, 10 pages in length.

http://www.extremenetworks.com/libraries/prodpdfs/products/ex_ware_tech_brief.pdf (Extreme Networks PDF), entitled "Tech Brief ExtremeWare 6.2," printed Jul. 29, 2003, 8 pages in length.

http://www.extremenetworks.com/libraries/prodpdfs/products/UnifiedWireless.asp (Extreme Networks PDF & web pages), entitled: Unified Access Architecture for Wired and Wireless Networks, printed Jul. 29, 2003, 10 pages in length.

In re U.S. Appl. No. 10/631,366, filed Jul. 31, 2003, by Kwan, entitled "System and Method for Source IP Anti-Spoofing security".

In re U.S. Appl. No. 10/850,505, filed May 20, 2004, by Szeto et al., entitled "System and Method for Source IP Anti-Spoofing Security".

Pfleeger, C. P., *Security in Computing*, Cover page, publication page, and pp. 426-434, Prentice Hall PTR, Upper Saddle River, NJ (1997).

In re U.S. Appl. No. 10/631,366, filed Jul. 31, 2003, by Kwan, entitled "System and Method for Source IP Anti-Spoofing security,".

In re U.S. Appl. No. 10/850,505, filed May 20, 2004, by Szeto, entitled "System and Method for Source IP Anti-Spoofing Security,".

U.S. Appl. No. 10/668,455, filed Sep. 23, 2003, Szeto.

U.S. Appl. No. 10/925,155, filed Aug. 24, 2004, Kwan.

Alcatel Internetworking, Inc., "Authenticated VLANs: Secure Network Access at Layer 2," An Alcatel White Paper, Nov. 2002, pp. 1-14.

Cisco Systems, Inc., Ch. 20, "Configuring Port-Based Traffic Control," Catalyst 3550 Multilayer Switch Software Configuration Guide, Cisco IOS Release 12.1 (13) EA1, Mar. 2003, pp. 1-14.

Cisco Systems, Inc., Ch. 27, "Configuring Network Security with ACLs," Catalyst 3550 Multilayer Switch Software Configuration Guide, Cisco IOS Release 12.1 (13) EA1, Mar. 2003, pp. 1-48.

Cisco Systems, Inc., Ch. 9, "Configuring 802.1X Port-Based Authentication," Catalyst 3550 Multilayer Switch Software Configuration Guide, Cisco IOS Release 12.1 (13) EA1, Mar. 2003, pp. 1-18.

Congdon, P. et al., "IEEE 802.1X Remote Authentication Dial in User Service (RADIUS) Usage Guidelines," The Internet Society, 2003, 30 pages, obtained from http://www.faqs.org/ftp/rfc/pdf/rfc3580.txt.pdf.

IEEE, The Institute of Electrical and Electronics Engineers, Inc., "Port-Based Network Access Control", 2001, pp. 1-134.

Microsoft, "Recommendations for IEEE 802.11 Access Points," Apr. 2, 2002, pp. 1-16, obtained from http://www.microsoft.com/whdc/device/network/802x/AccessPts/mspx.

Schmid et al., "An Access Control Architecture for Microcellular Wireless IPv6 Networks," Proceeding of 26th Annual IEEE Conference on Local Computer Networks, 2001, pp. 454-463.

Notice of Allowance mailed Sep. 4, 2008 in U.S. Appl. No. 10/850,505.

Final Office Action mailed Jun. 12, 2008 in U.S. Appl. No. 10/850,505.

Non Final Office Action mailed Dec. 7, 2007 in U.S. Appl. No. 10/850,505.

Notice of Allowance mailed Jul. 17, 2008 in U.S. Appl. No. 10/631,366.

Final Office Action mailed Oct. 10, 2007 in U.S. Appl. No. 10/631,366.

Non Final Office Action mailed Feb. 2, 2007 in U.S. Appl. No. 10/631,366.

Glenn, Michael, "A Summary of DoS/DDoS Prevention, Monitoring and Mitigation Techniques in a Service Provider Environment." SANS Institute, Aug. 21, 2003, 34 pages.

Haviland, Geoff. "Designing High Performance Campus Intranets with Multilayer Switching." Cisco Systems, Inc. 1998, 33 pages.

Notice of Allowance for U.S. Appl. No. 10/631,366, Mailed Jan. 13, 2009, 10 pages.

Notice of Allowance for U.S. Appl. No. 10/850,505, Mailed Jan. 14, 2009, 10 pages.

Final Office Action for U.S. Appl. No. 10/458,628, Mailed Feb. 26, 2009, 26 pages.

Non Final Office Action for U.S. Appl. No. 10/668,455, Mailed Mar. 20, 2009, 25 pages.

* cited by examiner

SYSTEM AND METHOD FOR ARP ANTI-SPOOFING SECURITY

RELATED APPLICATIONS

The present application claims benefit from U.S. Provisional Patent Application Ser. No. 60/472,170 filed May 21, 2003, which is incorporated herein by reference. The present application also claims benefit from U.S. Provisional Patent Application Ser. No. 60/472,158, filed May 21, 2003, which is incorporated herein by reference.

FIELD OF THE INVENTION

The present invention relates to a method of providing for enhanced security on a computer network to reduce the risk created by the spoofing of address resolution protocol (ARP) replies.

BACKGROUND

The address resolution protocol (ARP) is a widely known process by which devices obtain necessary address information for transmitting data packets over computer networks. FIG. 1 shows a simplified view of a computer network 100. The computer network 100 can include a number of different subnets. For example, FIG. 1 shows a subnet 128 which includes layer 2 network devices 102-112. Additionally hosts such as end user computer would be coupled to ports of the layer 2 network devices, additional network devices could also be coupled to ports of the network devices 102-112. A second subnet 130 is shown which includes layer 2 network devices 116-124. Similarly additional hosts or network devices could be coupled to ports of devices 116-124. As is known in the art, layer 2 network devices can include different types of devices for example, switches, hubs and bridges.

A host device on the subnet can communicate with other hosts by transmitting data packets to the host that they desire to communicate with. These data packets will include a number of pieces of information that are used to ensure that the data packet is received by the destination host. Each host device on the subnet has a MAC address. The MAC address is unique for each host, and is usually determined by the network interface card for the host device, as is widely known. Further, as is also widely known each host will generally be assigned an IP address when the host is coupled to the subnet. The assigning of an IP to a host can be done in a number of different ways. One very common technique is to use the Dynamic Host Configuration Protocol (DHCP), which provides for transmitting a data packet to a host when the host is initially coupled to the subnet, and this data packet will provide the host with its IP address.

When a source host on a subnet generates a data packet to be transmitted to a destination host on the subnet, the generated data packet should include a number of elements including the MAC address and IP address for the source host, and the MAC address and the IP address for the destination host. It is sometimes the case that the source host will have the IP address for the destination host, but not the destination MAC address. In this situation the source host will generate an ARP request. The ARP request is transmitted from a host, to a switch, and the switch will broadcast the ARP request across the subnet. FIG. 2a shows a view 200 of information from a switch of a subnet when an ARP request is sent out. At 202 the information shows that packet (pkt) 91 was broadcast. The ARP request is shown at 204. The source hardware address (MAC address) for the host generating the ARP request is shown as 08:00:46:2A:AB:BE. The source protocol address (IP address for the source host) is 192.168.1.152, The ARP request shows the destination protocol address (IP address for the destination) is 192.168.1.254.

FIG. 2b shows the response to the ARP request. As is known in the art the response to an ARP request is generated by the host device having the IP address which is identified in the ARP request. The ARP reply is sent to the device identified by the source MAC address and the source IP address in the ARP request. At 206 the reply is shown as packet 92 which a source address of 00:50:18:03:D5:30. The reply is directed to the destination 08:00:46:2A:AB:BE (the MAC address for the source of the ARP request) as opposed to being broadcast.

Area 208 shows specific contents of the ARP reply. The source of ARP reply has source hardware address (MAC address) of 00:50:18:03:D5:30, and a source protocol address (IP address) 192.168.1.254. The destination MAC address and IP address are shown as being the addresses for the host which generated the ARP request.

Layer 2 network devices on the subnet operate to route data packets based on the MAC addresses contained in the data packets generated by the hosts on the subnet. The IP addresses for the different hosts are utilized when the switches, or other layer 2, devices on the subnet recognizes that the MAC address is not coupled to the particular subnet. Once it has been determined that the MAC address of the destination host is not in the subnet, then the datapacket is switched through ports of the layer 2 network devices such that the datapacket is transmitted to the layer 3 router 126. The router 126 operates to route received data packets based on the IP address contained in the data packet, and the router 126 does not utilize the MAC address of the host which originally generated the data packet. For example, if a host device coupled to switch 102 of the first subnet were to transmit a data packet identifying a destination host which was coupled to the switch 116 of the second subnet, the data packet would be transmitted to the port of the router which was coupled to the first subnet, and based on the IP address of the destination host contained in the data packet the router would make the determination that the data packet should be transmitted to the second subnet 130 through a port of the router 126 which is coupled to the second subnet. As is known in the art a router can also operate to transmit datapackets, as IP datagrams over the Internet according to the TCP/IP protocol, and possibly other similar protocols.

ARP spoofing occurs in situations where an attacker poisons the ARP cache of the victim host, typically a personal computer (PC), by spoofing the MAC/IP pair of the ARP reply. For example, an attacker host could respond to an ARP request, which is broadcast on the subnet, as if the attacker host were the host which is assigned the IP address which is being queried in the ARP request. In response to the ARP request, the attacking host will generate a spoofed ARP reply in which the attacking host provides its MAC address and the IP address which was contained in the ARP request. This ARP response with the spoofed information, when received, will cause the host which generated the ARP request, to operate using the MAC address of the attacking host instead of the MAC address for the host which is actually assigned the IP address that was contained in the original ARP request.

A goal in an ARP spoofing attack is for the attacking host's forged, or spoofed, ARP reply (spoofed in the sense that the ARP reply shows an improper pairing of a MAC address and an IP address) to trick a target computer into caching the forged ARP entry, meaning that the target host will store the MAC address for the attacking host and use this MAC address in place of the MAC address for the actual desired destination host. When the ARP spoofing attack is successful the target will send data packets to the attacking host, and the target will have no idea that data packets have been redirected to the attacking host.

ARP spoofing can allow an intruder's computer to perform a man-in-the-middle (MIM) attack between hosts on a particular subnet and a gateway router port, and to perform session hijacking attacks. Using ARP spoofing, the attacker's host tricks the victim, or target, hosts into thinking that the attacking host is the gateway address through an ARP and MAC Address Spoof, as described above. The attacking host can then collect the data packet traffic and sniff the data packets (e.g. the attacking host can analyze and save information from the transmitted data packets). The attacking host can then route the traffic back to the gateway address.

Another way of sniffing on a switched network is through a concept called MAC flooding. The attacking host sends spoofed ARP replies to a switch on the subnet at a very high rate and overflows a MAC address table in the switch. This attack attempts to put the switch into broadcast/hub mode when their MAC tables are overflowed, which allows the data packet traffic to be sniffed. A variation of the MAC flood attack is to flood the network with spoofed ARP replies setting the MAC address table of a network gateway to the broadcast addresses, all external-bound data will be broadcast. This also enables sniffing on a switch.

ARP spoofing can also be used effectively as a Denial of Service (DoS) attack. By using ARP replies to flood the network with non-existent MAC addresses, host caches on the subnet are filled with garbage ARP entries that cause packets to be dropped. Session hijacking which allows an intruder, or attacking host, to take control of a connection between two computers can also be achieved using ARP and MAC spoofing similar to MIM attacks.

The risks poised by ARP spoofing attacks have been recognized, and currently there is a widely adopted software application called Arpwatch which is used to spot malicious ARP activity. Arpwatch is used by system administrators to detect changes in host IP addresses and ethernet addresses (MAC addresses). ARP watch listens for ARP requests which are broadcast and ARP reply packets which are sent on the ethernet (subnet) interfaces it is monitoring. For example, in the computer network 100 of FIG. 1, the device 114 could be computer, utilizing the Unix operating system, and running Arpwatch. The Unix computer 114 operates to listen to the ARP request and ARP reply traffic on the subnet 128, and to record changes made to IP address and MAC address pairs for hosts on the subnet. Arpwatch stores the MAC/ip address data in a file arp.dat, which should be empty before beginning to monitor activity.

Below is a sample output from arpwatch (version 2.0.1a1):

| 8:0:69:6:b2:b7 | 129.99.34.4 | 856807441 | buffett |
| 8:0:69:6:8c:6c | 129.99.34.7 | 856810206 | peace |
| 8:0:69:a:6a:a | 129.99.34.13 | 856810392 | heckler |
| 8:0:69:8:7e:39 | 129.99.34.14 | 856810397 | leo |
| 8:0:20:8:61:a2 | 129.99.34.17 | 856810390 | poppy |
| 8:0:69:8:7e:13 | 129.99.34.18 | 856810239 | win112 |
| 8:0:69:9:1d:9e | 129.99.34.19 | 856810235 | silk |
| 8:0:69:a:3f:7a | 129.99.34.43 | 856810192 | nothing |
| 8:0:20:18:1e:e0 | 129.99.34.44 | 856810464 | vips |
| 8:0:69:9:b1:5a | 129.99.34.45 | 856810205 | gecko |

The first column lists the 6 hexadecimal digit ethernet address (MAC address) of a host. Column two contains the ip address. Column three holds a timestamp for the reporting made by the host for activity regarding the ip/ethernet addresses. Lastly, the hostname is reported in the fourth column. While system activity is logged to file arp.dat, any occurring changes are reported to root through e-mail messages.

One limitation with Arpwatch has been its ability to see all the ARP traffic on the subnet. It cannot be used for network wide monitoring due to ARP's inability to send ARP natively over Layer 3 networks. For example, as is known in the art, the ARP request and ARP replies on the subnet 128 would not be transmitted through the layer 3 router to the second subnet. Further, in certain circumstances, it is possible that depending on the configuration of the subnet, and the location of the hosts generating the ARP requests and ARP replies, the Arpwatch program running on 114 may not even see all ARP request and ARP replies on the first subnet. In order to overcome some of these limitations in Arpwatch, implementations of networks utilizing mirrored ports on uplinks, tagged VLANs, etc. have been developed to increase the amount of ARP request and ARP reply traffic, which can be observed by Arpwatch. However, each of these fixes has been found to have limitations and can be difficult to implement in some network configurations.

DETAILED DESCRIPTION

An embodiment herein provides a system and method where layer 2 devices, such as switches on a subnet, operate to copy and forward information from ARP replies on a subnet, to a central ARP collector. It should be noted that in referring to a layer 2 device, this does not exclude a device which also includes some layer 3 capabilities. As is known in the art a number of network devices provide for both layer 2 and layer 3 functionality. For example, a layer 2 device can operate to direct the transmission of data packets based on the Ethernet or MAC address information in a data packet, and provide some layer 3 capability such as routing data packets based on an IP address information. In general layer 2 and layer 3 functions are widely known under the International Standards Organization's Open Systems Interconnection (OSI) model. Additional aspects of layer 2 and layer 3 operations are discussed in pending patent application titled MULTIPLE TIERED NETWORK SECURITY SYSTEM, METHOD AND APPARATUS, filed Jun. 11, 2003 U.S. patent application Ser. No. 10/458,628 (inventors Philip Kwan and Chi-Jui Ho) and which is assigned to the same assignee as the present patent application, and which is incorporated herein by reference.

Figure 1:
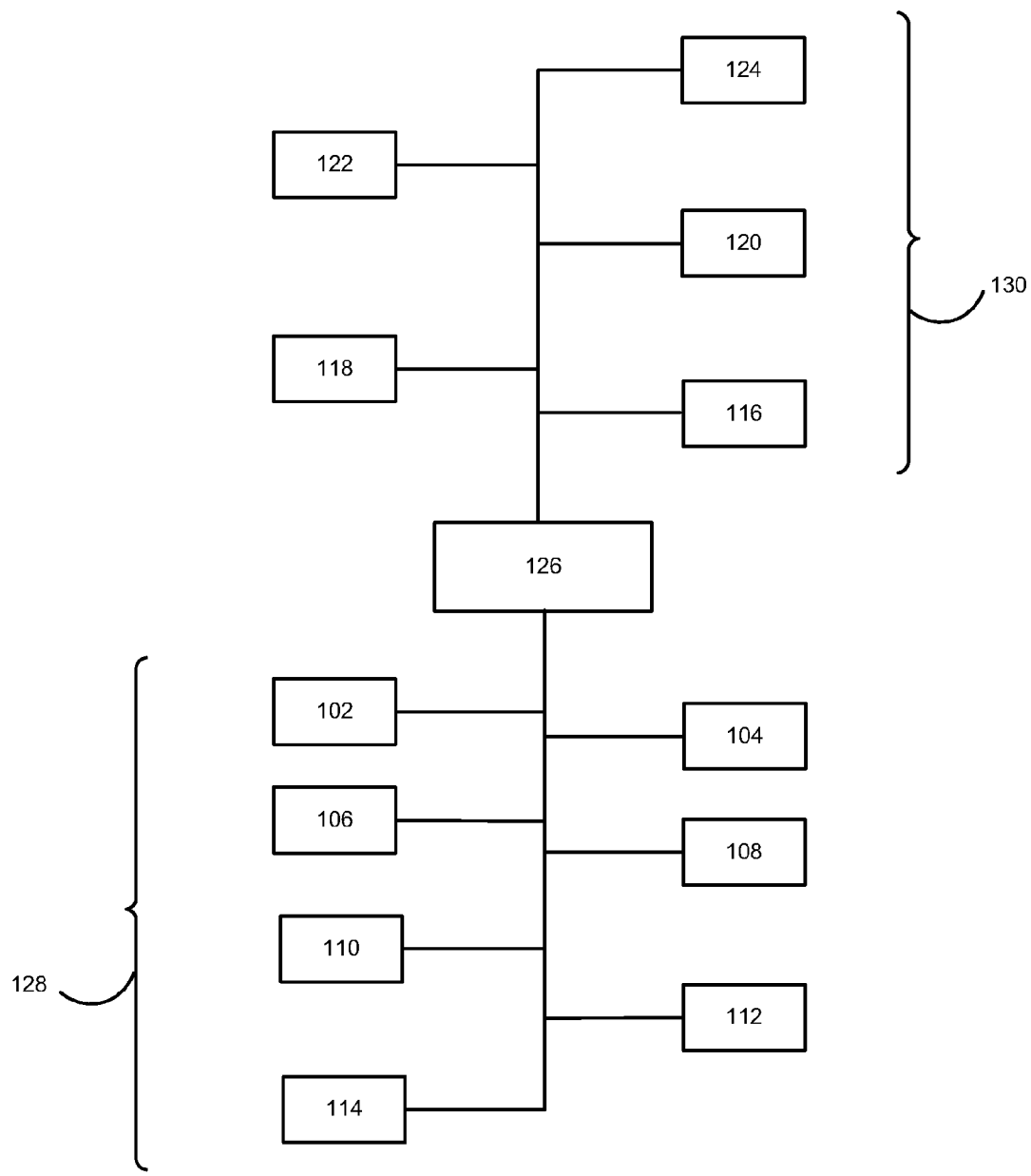
FIG. 1 shows a computer network of the prior art.
Figure 2A:
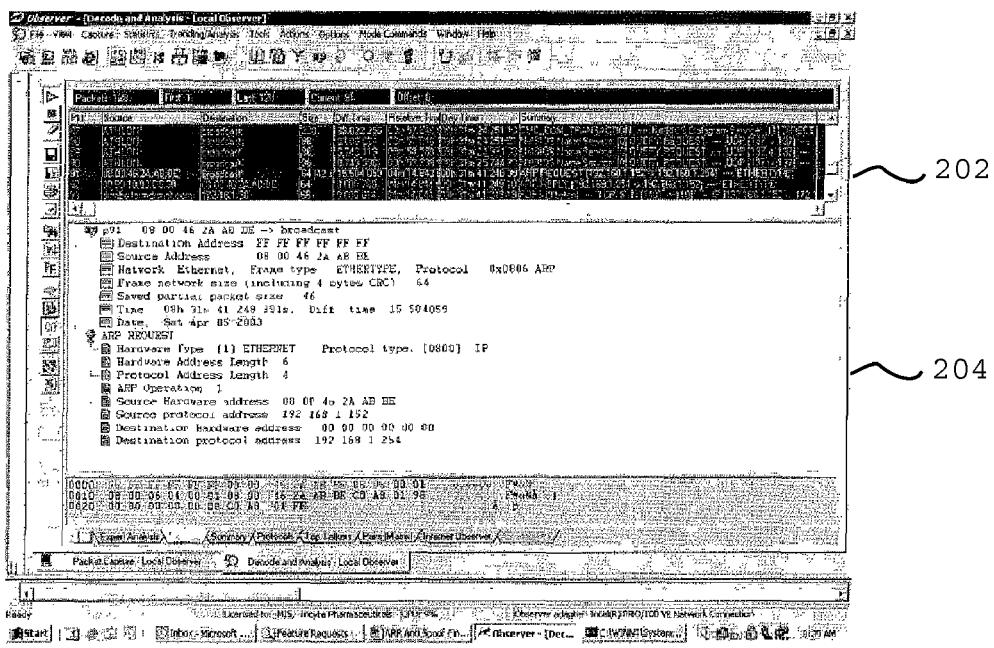
FIGS. 2a-2b show prior art ARP request and ARP reply.
Figure 2B:
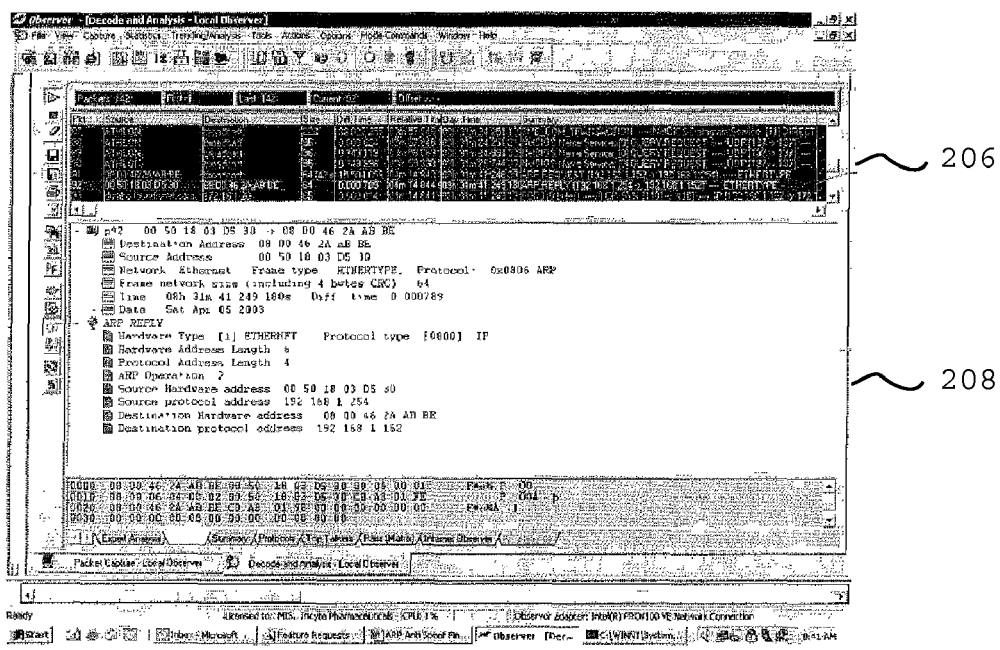
Figure 3:
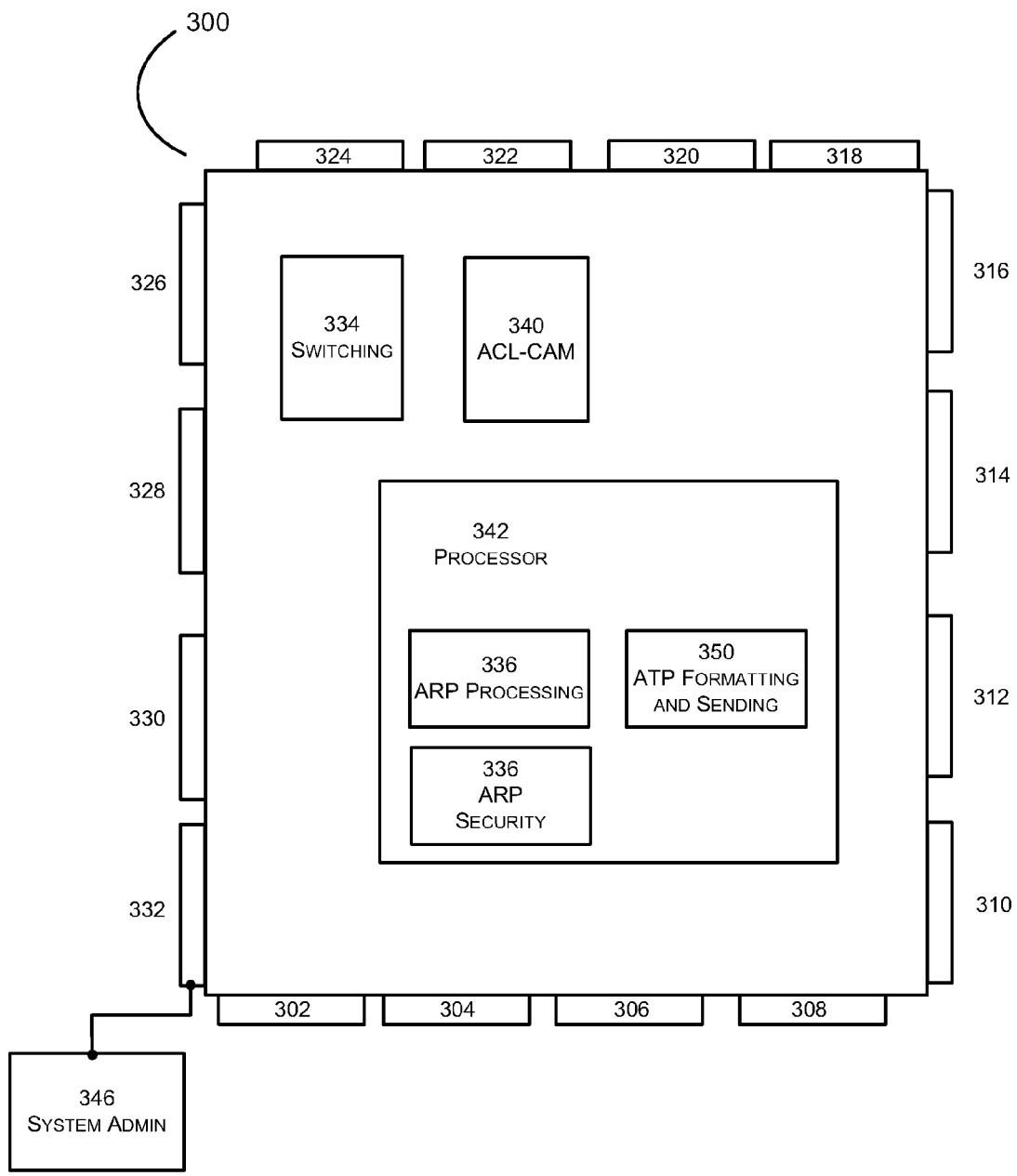
FIG. 3 shows an embodiment of a network device of the present invention.

One feature of an embodiment of a network device of the present invention, such as 300 shown in FIG. 3, is that a processor 242 handles the switching and processing of ARP Replies. An embodiment herein provides, that network devices, such as layer 2 switches, or layer 3 devices with end stations in a virtual ethernet port group, which process ARP replies, copy and forward ARP Replies to an ARP collector. Using this approach captures a larger volume of ARP replies which enhances the ability to recognize ARP Reply spoofing activity. Indeed the system and method herein could be implemented to allow for capture of all ARP reply information on a computer network.

As discussed in more detail below, an embodiment herein provides for formatting and transmitting copies of ARP Replies or ARP Broadcasts to an ARP collector, or to several ARP collectors. By forwarding copies of ARP replies, multiple network segments, and subnets can be observed using at a single point. This single point can be a computer programmed to store the ARP information as described below, and to analyze the information according to the procedures herein. By increasing the amount of ARP information and learning all Ethernet/IP Pairs at a central point, increased protection against ARP spoofing can be obtained.

An additional feature of an embodiment of a system and method herein, is that port information can be utilized in addition to the ARP information. As can be seen from the sample Arpwatch output (shown above), Arpwatch does not utilize port information. To obtain and utilize the port information, an embodiment of the network device herein provides for sending port information, such as information showing the port where the ARP reply packet was received, along with the transmitted copy of the ARP information. The date and time of the original ethernet/ip pair information should also be collected to show when the information was first learned.

Because every host, or IP device, must use ARP to communicate on an IP network, and all ARP Replies are handled by a processor in an embodiment of a network device herein as part of the normal processing of an ARP reply, an embodiment herein can provide a solution which provides for protection against ARP spoofing by providing a system or method which includes a number of possible functions.

For example, the ARP Protection feature herein allows for one, or several, ARP collectors to be defined at the global level. In determining a configuration for use of ARP collectors, and determining which ARP information to copy and transmit it may be beneficial to utilize a methodology similar to known sFlow systems. Additionally the assignee of the present patent application has developed enhanced sflow systems and methods as described in currently pending and commonly assigned patent application entitled NETWORK MONITORING USING STATISTICAL PACKET SAMPLING, with Ser. No. 10/107,749 filed Mar. 26, 2002, which is incorporated herein by reference in its entirety.

An embodiment of the present invention, allows for the ARP Protection feature to be selectively enabled on a port-by-port bases, such that a system administrator can select ports to monitor ARP traffic on. This will allow a system administrator to avoid heavy traffic uplink ports and select only the end-user ports that supporting areas with high-risk users (hackers).

In addition to normal processing of the ARP Reply packet, the ARP protection features described herein provide for capturing ARP reply information which is received at port on the network device. This captured ARP Reply information is encapsulated in a standard IP datagram, datapacket, and sent it to a central ARP collector. This capturing of ARP reply information is referred to herein as ARP Tunnel Protocol (ATP). The ATP can utilize encryption technologies such as MD5 and a shared secret key between the network device and an ARP collector. This will ensure that the ARP traffic being sent to the ARP collector is legitimate and unmodified. Hackers may indeed learn of the ATP operation and may attempt to spoof packets to the ARP collector to poison its database. Using MD5 and a secret key greatly decreases the likelihood of this type of activity being successful. Further, instead of using MD5 technology, a unique protocol could be utilized for formatting the information in the ATP data packets; this protocol would be unique and used specifically for the formatting of the ATP packets, and only data packets conforming to this unique protocol would be utilized by the ARP collector.

Figure 7:
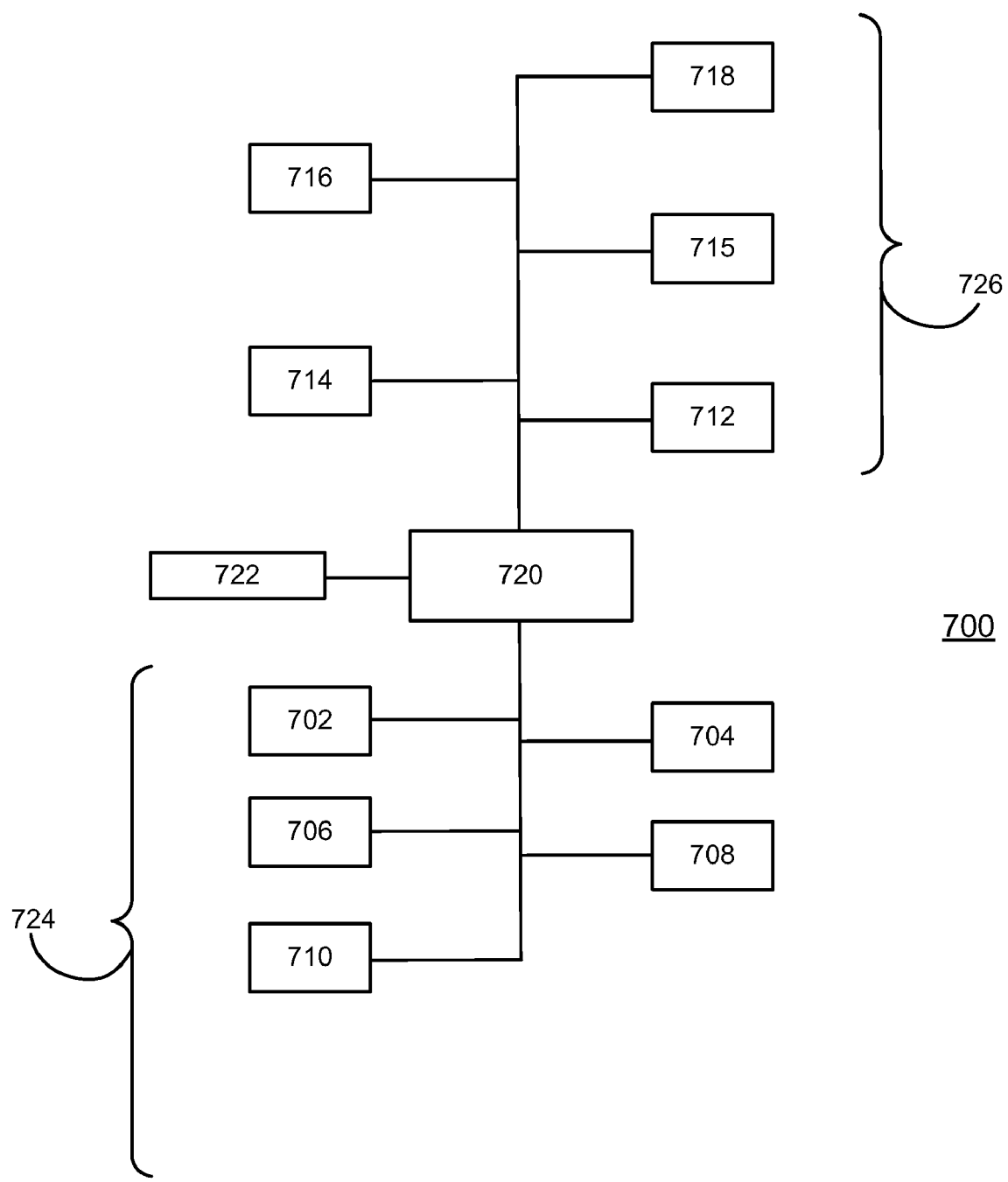
FIG. 7 shows an embodiment of a computer network of the present invention.
Figure 8:
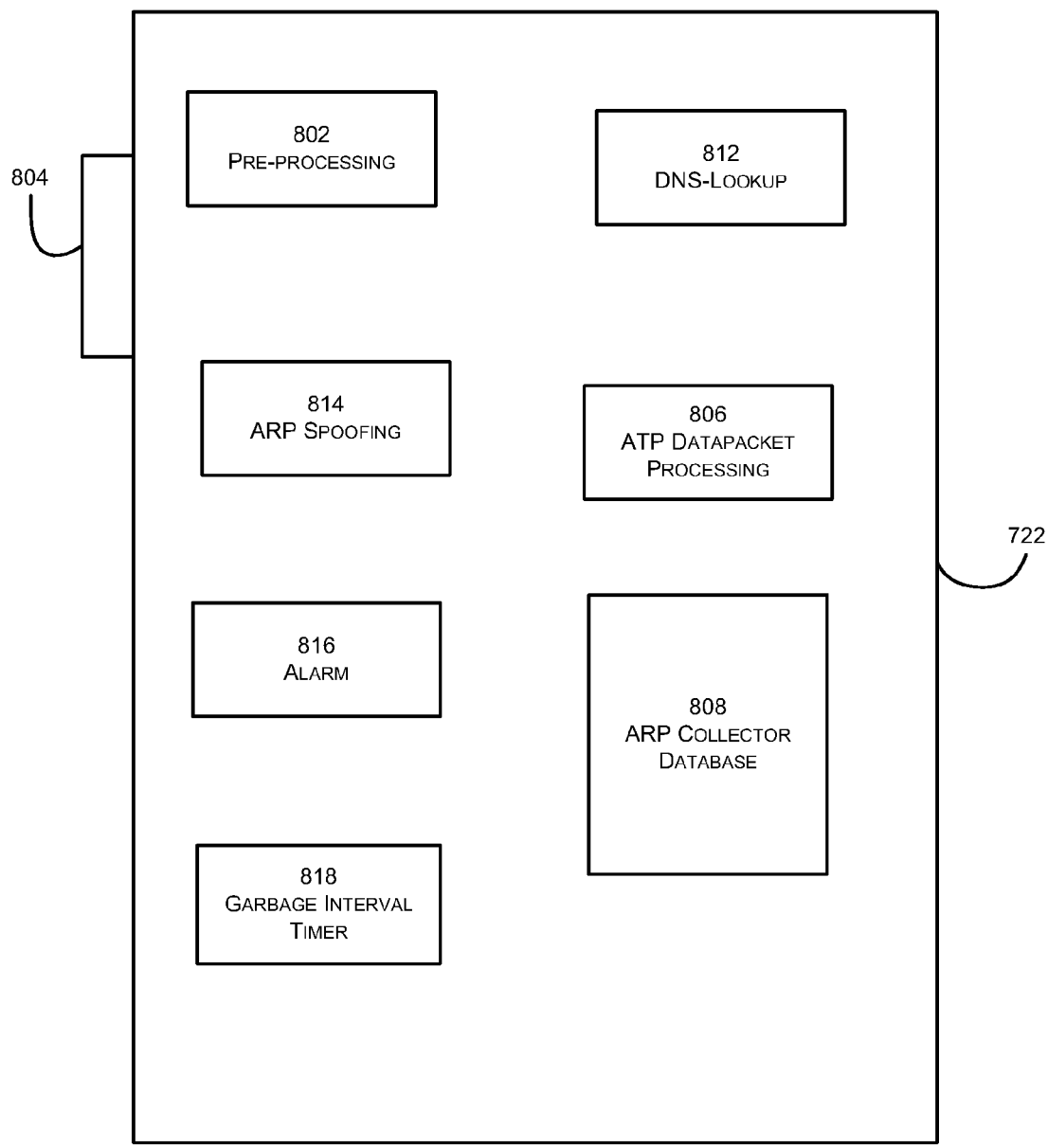
FIG. 8 shows an ARP collector of the present invention.

A computer network 700 of an embodiment of the present invention is shown in FIG. 7 and discussed in more detail below. The computer network 700 provides an ARP collector 722. One possible embodiment of the ARP collector 722 is shown in FIG. 8. In this ARP collector 722 pre-processor logic 802 is provided that will inspect the ATP packet coming into an interface 804 of the ARP collector. The pre-processor logic will reject all ARP traffic that is not from a network device where the ATP packet is of the correct format. Further, if encryption is utilized, then valid ATP packets will be unencrypted with the MD5 secret key and added to an ARP collector database as normal ARP Reply packet information. An ATP datapacket processing module 806 operates to decrypt and analyze the received data packet to obtain the information for the ARP collector database 808. If there is any additional information in the data packet, such as source port information, that information is also added to the database 808.

The ARP collector can also provide a DNS lookup module 812 which operates to perform a DNS lookup on the ATP packet to add the fully qualified host name to its database record. Using ARP Spoofing detection module 814, the ARP collector can monitor the ARP reply information in the ATP packets. The ARP collector can provide an ARP spoof alarm generator 816 that is triggered when there is a rapid "flip flopping" of the ethernet/ip address pair, such as: Original ethernet/ip pair→spoofed ethernet/ip pair→original ethernet/ip pair. The ARP spoofing detection module 814 can be programmed to allow a system administrator to set the duration for the ARP Spoof cycle, or a default duration can be utilized. The time duration should be short enough such that it is very unlikely that the change of the Ethernet/IP address pair is legitimate. The ARP collector could be implemented in a standalone computer, or the software could be used to program a computer which is providing additional system functions.

When an ARP spoof condition is detected, the ARP Collector may perform a number of different actions, as determined by its programming. One possibility is that the ARP collector will do nothing. For example, the ARP collector may just be building and collecting data, or the ARP protection feature may not be activated on a particular port. The ARP collector could also generate an alert. This alert could take a number of different forms. The alert could include logging the suspected ARP spoofing activity in a log in the ARP collector and sending a notice to an external Syslog server. The alert could also include emailing a system administrator at a predefined email addresses. In addition to providing an alert, the system could operate to disable the port on which the suspected spoofed ARP reply was received for a predefined amount of time. This predefined amount of time could be set to a default amount time, for example 10 minutes, or a system administrator could set the amount of time to disable the port. In some cases, the port might be disabled for a much longer period of time or possibly permanently. In some embodiments, the MAC filtering on the network device could be utilized to filter a MAC address which is suspected of generating spoofed ARP replies. This filtering could be set for a predefined amount of time (e.g., 10 minutes), and in some cases the suspected device could be MAC filtered permanently. To facilitate automated implementation of these security features the ARP collector could communicate instructions directly to the network switching devices on the subnets 724 and 726 of the computer network 700 shown in FIG. 7.

Figure 4:
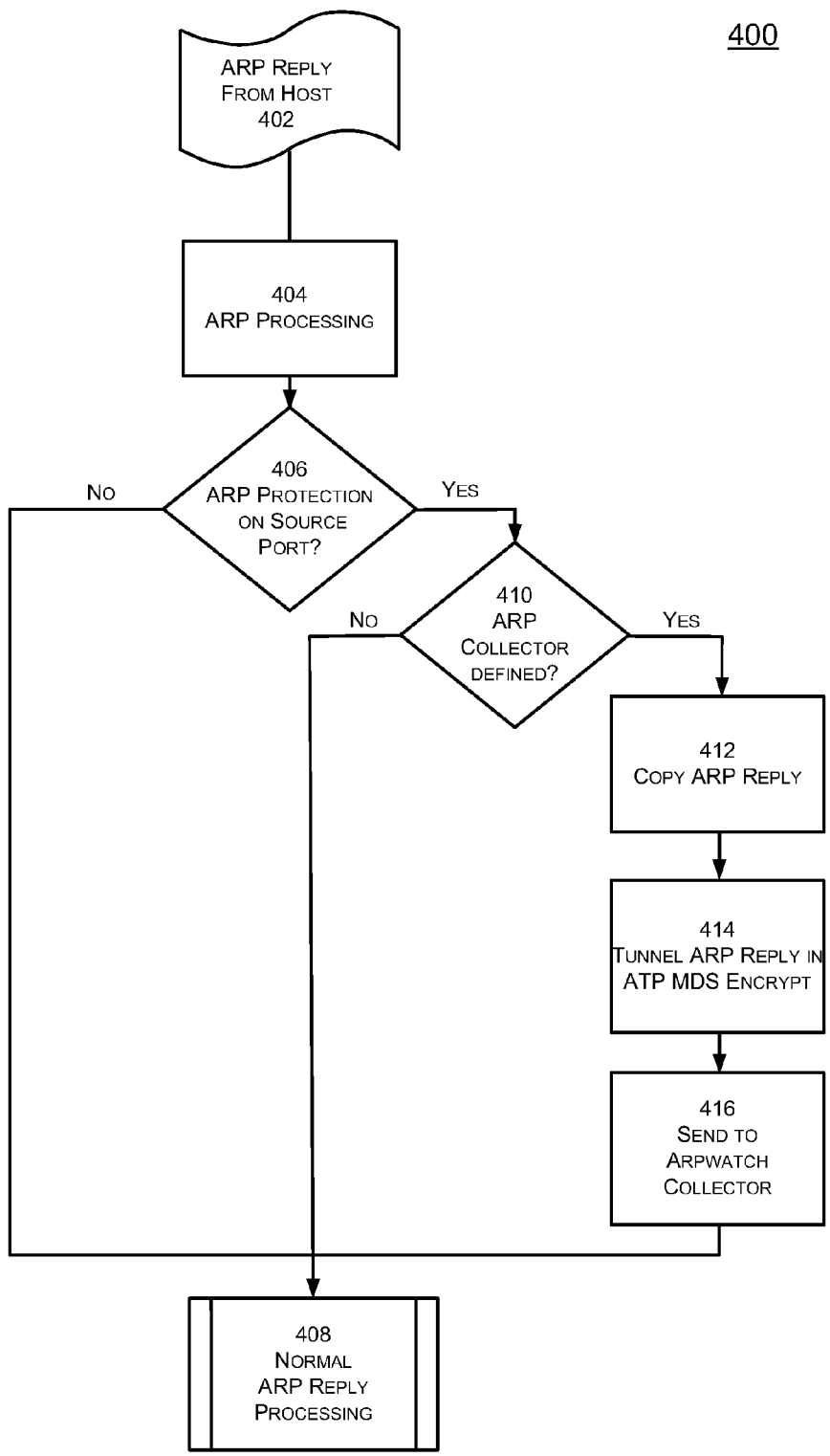
FIG. 4 shows a method of an embodiment of the present invention.

FIG. 4 shows a method 400 of an embodiment of the invention. The method provides for receiving 402 an ARP reply packet from a host on a port of a network device such as a switch. The network device then processes 404 the ARP reply packet using a CPU. The processing of the ARP reply packet would typically include reviewing the MAC address information in the ARP reply to determine which port of the network device that the ARP reply should be transmitted through. A determination 406 is made as to whether ARP spoofing protection has been activated for the port on which the ARP reply packet is received. If ARP spoofing protection has not been activated for the port then normal ARP reply processing 408 proceeds and no ARP spoofing procedures are implemented. If ARP spoofing has been activated on the port, then the next step is to determine 410 if an ARP collector has been defined. If there is no defined ARP collector, then normal ARP reply processing 408 will proceed until an ARP collector is defined. If an ARP collector has been defined, then the ARP reply is copied 412. Copying of the ARP reply may include copying all the information from the ARP reply, or copying only selected information, in both cases this is generally referred to herein as copying the ARP reply. The copied ARP reply is then formatted (wrapped) 414 using an ARP Tunnel Protocol (ATP) format. As discussed above the ATP protocol may also provide for encrypting the packet using MD5 and signing it with the shared secret key. The ATP packet is then sent 416 to the ARP collector, and further normal processing of the ARP reply packet continues 408.

The ARP Collector will accept the ATP packets from all ARP Protection enabled network devices. Valid ATP packets will be decrypted and stored in a dedicated ARP Database. At the minimum, the following ARP Reply attributes should be stored:

| Ethernet MAC | Source IP | Src. Port | Original Date/Time | Latest Date/Time | Hostname |
|---|---|---|---|---|---|
| 8:0:69:6:b2:b7 | 129.99.34.4 | E2/15 | 856807441 | | buffet |
| 8:0:69:6:8c:6c | 129.99.34.7 | E3/24 | 856810206 | | peace |
| 8:0:69:a:6a:a | 129.99.34.13 | E7/2 | 856810392 | | heckler |
| 8:0:69:8:7e:39 | 129.99.34.14 | E5/13 | 856810397 | | leo |
| 8:0:20:8:61:a2 | 129.99.34.17 | E6/21 | 856810390 | | poppy |
| 8:0:69:8:7e:13 | 129.99.34.18 | E4/2 | 856810239 | | win112 |
| 8:0:69:9:1d:9e | 129.99.34.19 | E7/20 | 856810235 | | silk |

The above reference to the Ethernet MAC refers to the device's MAC address, for the host which generated the ARP reply. The reference to Source IP, above, is a reference to the device's Source IP address, for the host which generated the ARP reply. The reference to the Source Port, is a reference to the port on which the ARP Reply packet was received. It should be noted that the source port information may not normally be included in an ARP reply, but the network device could identify this information and include it in the ATP data packet sent to the ARP collector. The Original Date column refers to the first time the ARP Collector learned the ethernet/ip pair, and specifically the first time the Ethernet address was identified. The Latest Date column is the last ethernet/ip pair received from the device, and this information is used to spot flip-flopping conditions. The hostname column shows the DNS/WINS name of the device sending the ARP Reply. Additional optional identification information may include a chassis identifier, such as the management IP address of the device, device name, or device serial number.

Figure 5:
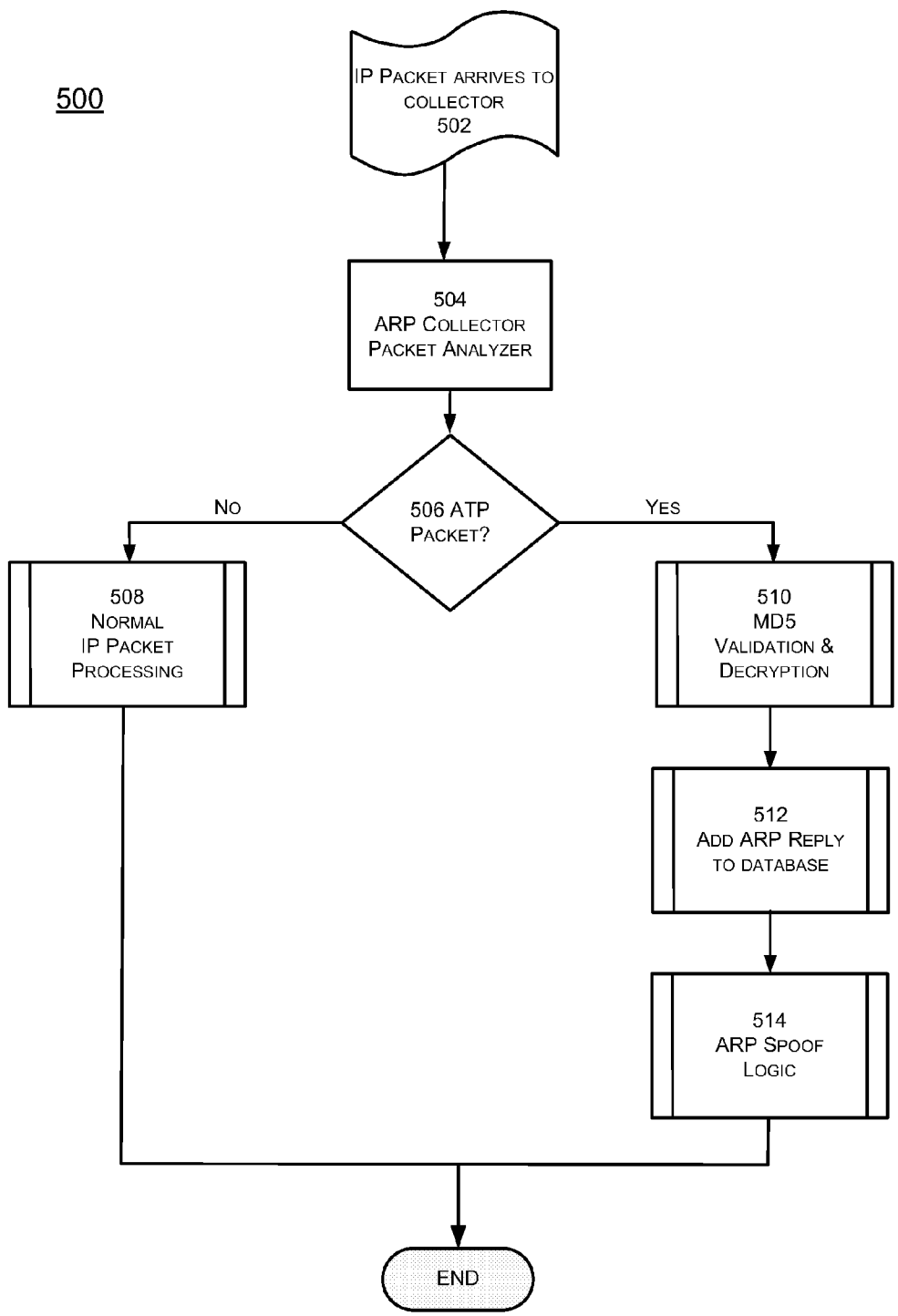
FIG. 5 shows a method of an embodiment of the present invention.

FIG. 5 shows a method 500 of an embodiment of the invention. The method provides for IP data packets to be received 502 on an interface of a computer running ARP collector software. IP data packets received are analyzed 504 to determine 506 if they are ATP packets; this initial analysis can consist of a quick check of the Ethertype field for the packet to make this determination. If the IP packet is determined not to be an ATP packet, then the IP packet will be processed 508 as would other IP packets received on the port. If the received IP packet is determined to be an ATP packet at 506, then the ARP reply information is derived 510 from the ATP packet. Where the ATP packet has been encrypted using MD5, the ATP packet would be decrypted, and the protocol formatting of the ATP packet would be analyzed to determine that it is a valid ATP packet. Assuming it is a valid ATP packet then the ARP reply information in the ATP is stored 512 in the ARP reply database of the ARP collector. The ATP packet can include the source port information indicating the port at which the ARP reply was received and this source port information is also stored in the ARP reply database. After the information has been stored in the ARP reply database, ARP spoofing logic, of the ARP collector will analyze 514 the information in the database to determine if there is an ARP Spoof condition and react accordingly.

The ARP collector is programmed to provide a range of functions in connection with providing ARP anti-spoofing protection. This operation provides that when a host initially comes online to a computer network, and the ATP packets is transmitted to the ARP collector, the ethernet/ip pair for the host is recorded in the ARP collector database with the original date stamp and port information. As the ARP collector receives subsequent ARP Replies from the same host device, these subsequent ARP replies are compared to this original record. If there are no changes in the ethernet/ip pair information, the ARP collector records only the date and time in the Latest Date/Time field and discards the ARP Reply (nothing has changed).

When the collector detects a change in the ethernet/ip information for the device, one of two conditions has occurred: a legitimate IP Address change was made or the device has sent an ARP Reply Spoof. The ARP collector should search the database to see if there is another device holding the same IP Address. If there is another existing device with the IP address noted in the new ethernet/ip pair, the latest date/time stamp of the existing device should be checked to see when the last time the IP address was used. If it was very recent, this should be flagged as a warning and the ARP collector should watch for another change back to the original IP address. DHCP installations will usually hold the same IP address for the host for a certain amount of time and not hand it to another device. A "garbage collector" timer can be used to groom the database every n seconds to remove the old ARP Reply records that have not been active. This will help reduce false positives (e.g. situations where old data base entries indicate that IP address is assigned to particular device, where the IP address has in fact been more recently assigned to another device).

If this is a Spoofed ARP Reply, there should be another device in the ARP collector database with the same IP Address. This is most likely the host that the victim host was talking to originally. The latest date/time of the victim host should be fairly recent. This can be the first sign of a possible ARP Spoof attempt.

When the ARP Collector sees that an ethernet/ip pair has changed, it records this information along with the originally learned ethernet/ip pair for this source MAC address. The ARP collector also searches the database to see if there is another MAC address holding the same Source IP address. Where another MAC address is seen as holding the same source IP address, the latest date of the other device is compared to the newly learned ethernet/ip pair's originally learned date. If they are very close together, this adds evidence that a Spoofing attempt is likely taking place. If the date/time are far apart, this is most likely an IP address change.

Typically after an attacking host has engaged in an ARP Reply spoofing session, the Ethernet/IP pair for the attacking host, returns back to the original settings, and a third ethernet/ip pair will be noted for the same MAC address. The original date/time from the three packets are compared against the allowable time window. If it is shorter than the allowable time window, an ARP Spoof condition is assumed. When a flip-flop condition with the same MAC address but different IP Addresses it should also be flagged.

If this was a legitimate IP Address change, the ARP Collector will leave the records in the database and let the garbage collector routine groom the old records out after the garbage interval has been met. The garbage interval is a timer, shown in FIG. 8 as 818, that determines a stale ARP Reply record if the latest date/time is older than the predefined garbage interval.

As each record is recorded in the database, it is stamped with several date and time fields to allow the ARP Collector to make intelligent decisions on how to process multiple ethernet/ip pair conditions. The garbage collector timer 818 can include a settable time parameter that is added to each record as it is created or updated. The Garbage Timer allows the system to compare newly received ARP Replies with older existing records in the database.

As the newly received ARP Replies are compared to existing records, a decision is made based on the results of the Garbage Collector timer. If the newly received ARP Replies are within the Garbage Collector interval, then the logic moves down the path of a possible ARP Reply Spoof condition or a bad IP Change condition. This turns the "Flip-Flop" tag to a value of 1 to tag the beginning of the ARP Reply spoofing process.

If the newly received ARP Reply is outside the Garbage Collector interval, the existing record is stale and can be removed from the system. As a separate grooming function, a database scavenging routine can be added to remove all stale records from the database at preset intervals—such as low usage times.

Figure 6:
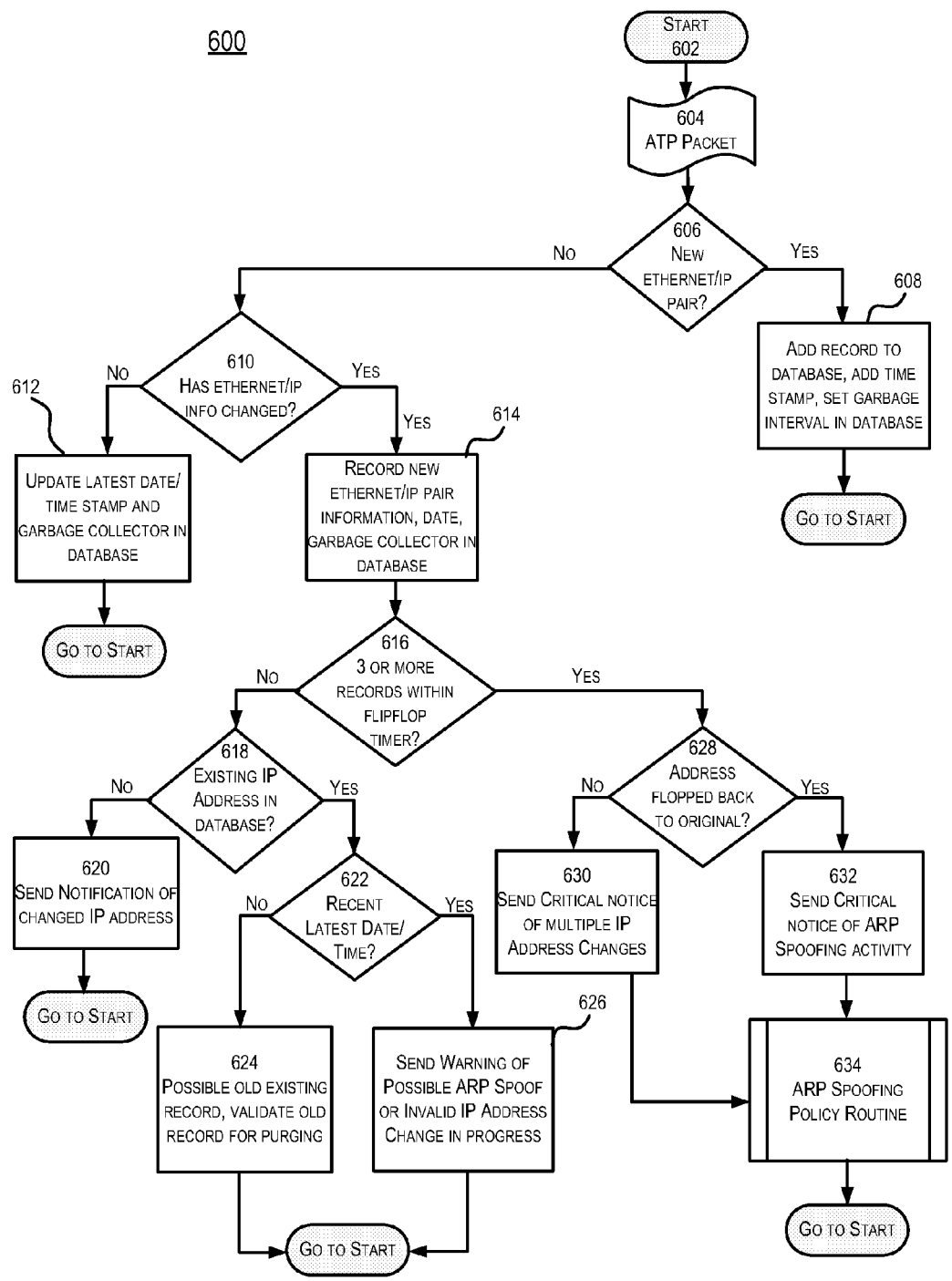
FIG. 6 shows a method of an embodiment of the present invention.

FIG. 6 shows a method 600 of an embodiment of the invention. Initially an ARP reply is received on a network device, and the network device copies and forwards 602 information from the ARP reply as an ATP data packet. The ATP packet is then received 604 by the ARP collector, and the information in the ATP packet is analyzed. A determination 606 is made as to whether the ARP reply information, specifically the Ethernet/IP address pair information, in the ATP packet, is a new Ethernet/P pair. If it is a new Ethernet/IP address pair, then the ARP reply information is added 608 to the ARP collector database, along with time stamp, and port information.

If it is determined that the Ethernet/IP address is not new at 606, then a determination 610 is made as to whether the Ethernet/IP pair in the ARP reply has changed. If it is determined that the Ethernet/IP pair has not changed, then the previous entry for this Ethernet/IP pair is updated 612 to record this latest date and time-information in the ARP collector database, and this latest time information can be utilized by the garbage collector timer. If the Ethernet/IP pair has changed then the new Ethernet/IP pair is recorded 614 in the ARP collector database, as well as date and time information for use by the garbage collector. Information in the ARP collector database is then analyzed 616 to determine if the Ethernet address has had more than three Ethernet/IP address pair changes within a flip-flop timer time period. If there have not been more than 3 changes within the time period, then the ARP collector database is searched 618 to determine if the IP address of the new Ethernet/IP pair is already in the database. If the IP address is not in the database, then a message can be sent 620 to a syslog to provide notification of the changed IP address.

If it is determined at 618 that the IP address of the new Ethernet/IP address pair was already in the ARP collector database, then the time information indicating the most recent entry for the IP address previously recorded in the database, is compared 622 with the time of receipt of the new Ethernet/IP address pair. If it is determined that the previous information of the IP address was stored more than a predetermined amount of time before receipt of the new Ethernet/IP address pair, then the old record is identified 624 as a possibly expired entry and can be considered for deletion. Conversely if the comparison, shows that the previous entry of the IP address was recorded or updated only a short time before receipt of the new Ethernet/IP pair, then the ARP collector can send 626 a warning of a possible ARP spoof of invalid IP address change.

If at 616 it is determined that there have been 3 or more changes in the Ethernet/IP address pair for a given host, then a determination 628 is made as to whether the recently received Ethernet/IP address pair changes the Ethernet/IP address pair back to the original pairing. If a determination is made that the address pair was not made back to the original Ethernet/IP address pair, then message indicating multiple IP address changes can be sent 630. In addition the procedures for responding to possible ARP spoofing conditions can include taking different ARP antispoofing procedures 634 including blocking ports on which possibly spoofed ARP replies are received, or MAC filtering certain hosts based on the MAC address. Additionally if it is determined that the recently received ARP reply flopped the Ethernet/IP address pair back to the original pairing then a notice of ARP spoofing activity can be sent 632, and ARP antispoofing procedures can be followed 634.

FIG. 3 shows an embodiment of a network device 300. This device provides for layer 2 operations, and in some embodiments may also include some layer 3 functions. The network device includes a plurality of ports 302-330 which can be coupled with other network devices or with end user hosts. Devices coupled to these ports can communicate with other devices on a computer network. A view of a computer network 700 of an embodiment of the present invention is shown in FIG. 7. The computer network 700, as shown includes a first subnet 724, which includes network devices 702-710, and includes a second subnet 726, which includes network devices 712-718. To obtain and optimal degree of ARP antispoofing protection, each of the network devices could be devices such as the device 300 shown in FIG. 3. The network device 300 includes a switch module 334, and can include access control list which are data fields in a content addressable memory 340, which is referred to as an ACL-CAM. By utilizing a content addressable memory where the functionality of the memory is determined by hard wiring (as opposed to a CPU which requires the loading of software), the switching of the data packets is done at a very high speed. When hosts coupled to the ports of the device 300 are transmitting data packets with necessary MAC address and IP address information. The switching module 334 and the ACL-Cam 340 can operate to switch data packets between ports of the network device 300 without putting in load on the processor 342 of the network device 300. The ACL-CAM can also implement MAC address filtering on the ports. When hosts are generating ARP requests and ARP replies the processor 342 utilizes an ARP processing module 336 in connection with the switching and processing of the ARP data packets. The processor 342 also includes an ATP formatting and sending module 350 which copies ARP reply information and formats the information in the ATP format as described above, which can include MD5 encryption. The ATP packets can then be transmitted to a layer 3 router, which will direct the ATP packets to an ARP collector 722.

The processor 342 can also include an ARP security module which operates to receive ARP input from a system administrator computer 346 which can be coupled to a port 332 of the device 300. This input from the system administrator can operate to enable the operation of the ATP module 350 for ARP replies on selected ports of the network device 350. Additionally, the ARP security module 338 could operate to receive communications from the ARP collector 722, where such communications may instruct the network device to block certain ports, or to provide MAC addresses to filter, where certain MAC address are identified as attempting to transmit spoofed ARP replies through the device 300, based on ARP collector antispoofing procedures.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for detecting ARP spoofing in a computer network, the method comprising:
    receiving a data packet at an ARP collector, wherein the data packet is generated by a first device on the network, and wherein the data packet includes information from an ARP reply received at the first device from a second device on the network, the information including a MAC address of the second device and an IP address given as a source IP address of the second device in the ARP reply; and
    analyzing at least two associations in a database accessible to the ARP collector to determine whether ARP spoofing occurs, wherein the analyzing is based on a time associated with a first association in the database and a time associated with a second association in the database, and wherein the first and second associations include MAC addresses that are identical to the MAC address included in the data packet.

2. The method of claim 1, wherein the data packet is encrypted by the first device.

3. The method of claim 1, wherein each of the at least two associations includes a time at which an associated ARP reply was received on a port.

4. The method of claim 3, wherein each of the at least two associations further includes an identification of the port.

5. The method of claim 1, wherein if it is determined that there is a spoofed ARP reply, blocking a port on which the spoofed ARP reply was received.

6. The method of claim 1, wherein if it is determined that there is a spoofed ARP reply, filtering a MAC address which generated the spoofed ARP reply at a port at which the spoofed ARP reply was received.

7. The method of claim 1 further comprising:
    transmitting the data packet to the ARP collector; and
    generating an alert if an ARP spoofing condition occurs.

8. A device for storing and analyzing ARP information to detect ARP spoofing, the device including:
    an interface for receiving packets, wherein the packets include ARP reply information, including information identifying a port on a network device where an ARP reply was received;
    a processor coupled to the interface, and programmed to analyze a first received packet, and to identify a first MAC address which is identified as a source MAC address for a first ARP reply, and to identify a first IP address which is identified as a source IP address for the first ARP reply, and to identify a first port on which the first ARP reply was received;
    a database coupled to the processor, and which stores information from the packets, wherein for the first packet received at the interface, the database stores the first MAC address, the first IP address, and the port on which the first ARP reply was received; and
    wherein the processor is further operable to analyze information in the database and information in a received packet to identify whether a spoofed ARP reply has been transmitted by a host, the analyzing being based upon a time associated with a first entry stored in the database and a time associated with a second entry stored in the database, the first and second entries including MAC addresses that are identical to a MAC address included in the received packet.

9. The device of claim 8, further including a garbage collection timer module which determines when ARP reply information is stale and should be cleared from the database.

10. The device of claim 8, wherein processor is further operable to generate an alert if a spoofed ARP reply has been detected.

11. The device of claim 8, wherein the processor is further operable, to identify a port on which a spoofed ARP reply has been received and to generate a signal which causes the port to be blocked in response to identifying the port on which the spoofed ARP reply has been received.

12. The device of claim 8, wherein the processor is further operable to identify a port on which a first spoofed ARP reply has been received and to identify a MAC address of an attacking host which generated the spoofed ARP reply, and in response to identifying the port, and the MAC address of the attacking host, the processor generates a signal which indicates that the MAC address should be MAC filtered at the port.

13. The method of claim 1, wherein the MAC address and the IP address included in the data packet are stored as part of a third association in the database, wherein the third association is associated with a time, and wherein analyzing at least two associations in the database comprises:

determining whether ARP spoofing occurs based on whether the time associated with the first association, the time associated with the second association, and the time associated with the third association fall within a predefined time interval.

14. A network device comprising:
a database;
one or more ports; and
a processing component configured to:
    receive a data packet generated by another network device, the data packet including a MAC address and a source IP address from an ARP reply; and
    analyze at least two associations in the database to determine whether the ARP reply is a spoofed ARP reply, wherein the analyzing is based on a time associated with a first association in the database and a time associated with a second association in the database, and wherein the first and second associations include MAC addresses that are identical to the MAC address included in the data packet.

15. The network device of claim 14, wherein said another network device is a Layer 2 switch.

16. A method for detecting ARP spoofing in a computer network, the method comprising:
receiving a data packet at a network device wherein the data packet is generated by another network device, the data packet including information from an ARP reply, the information including a MAC address of a device and an IP address given as a source IP address of the device in the ARP reply; and
analyzing information stored in a database to determine whether ARP spoofing occurs, wherein the analyzing is based on a time associated with a first association stored in the database and a time associated with a second association stored in the database, and wherein the first and second associations include MAC addresses that are identical to the MAC address included in the data packet.

17. A computer-readable medium having stored thereon program code which, when executed by a control component of a network device, causes the network device to detect ARP spoofing, the program code comprising:
    code for receiving a data packet generated by another network device, the data packet including information from an ARP reply, the information including a MAC address of a device and an IP address given as a source IP address of the device in the ARP reply; and
    code for analyzing information stored in a database to determine whether ARP spoofing occurs, wherein the analyzing is based on a time associated with a first association stored in the database and a time associated with a second association stored in the database, and
    wherein the first and second associations include MAC addresses that are identical to the MAC address included in the data packet.

* * * * *